(12) United States Patent
Scholz et al.

(10) Patent No.: US 7,809,810 B2
(45) Date of Patent: Oct. 5, 2010

(54) NETWORK AND METHOD FOR THE CONFIGURATION THEREOF

(75) Inventors: Frank Scholz, Grafenau (DE); Dirk Bolte, Gaertringen (DE); Friedrich Michael Welter, Gaertringen (DE); Martin Kuenzel, Dettenhausen (DE); Friedemann Baitinger, Jettingen (DE); Andreas Bieswanger, Ehningen (DE); Juergen Saalmueller, Boeblingen (DE); Andreas Arnez, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 12/190,960

(22) Filed: Aug. 13, 2008

(65) Prior Publication Data
US 2009/0063666 A1    Mar. 5, 2009

(30) Foreign Application Priority Data

Sep. 5, 2007  (DE)  .............................. 07115789 U
Sep. 5, 2007  (EP)  ................................. 07115789

(51) Int. Cl.
*G06F 15/16* (2006.01)

(52) U.S. Cl. ....................... 709/220; 709/223; 709/249; 709/250

(58) Field of Classification Search ................. 709/249, 709/250, 220, 221, 223, 224, 225
See application file for complete search history.

(56) References Cited

U.S. PATENT DOCUMENTS

| 7,039,682 | B2 | 5/2006 | Baitinger |
| 7,447,796 | B2 * | 11/2008 | Forrester .................... 709/238 |
| 2004/0258074 | A1 * | 12/2004 | Williams et al. ......... 370/395.5 |

OTHER PUBLICATIONS

Itai et al., "Symmetry Breaking in Distributed Networks" Information and Computation, 1981, v.88, pp. 150-158 (31 pages in NPL).*
Pritchard et al. "Symmetric Network Computation" SPAA'06, ACM, 10 pages.*

* cited by examiner

*Primary Examiner*—David Lazaro
(74) *Attorney, Agent, or Firm*—Jason O. Piché

(57) ABSTRACT

A method and corresponding apparatus is provided for determining the location of a configuration server being connected to a totally symmetric network infrastructure that does not exhibit any symmetry breakers on network level. The configuration server reaches a decision to determine its network-wide unique configuration in order to be able to serve controllers. This decision depends on the plug position of the configuration server under consideration and the assumption of plugging rules governing a "good" network infrastructure. The controllers periodically send network packets that will be marked if they traverse specific connection elements in the network. The origin and the path of a network packet can be determined. The decision making is based on a majority function based on the packets received by the configuration server. If a decision cannot be made, then errors in the cabling structure can be detected.

11 Claims, 7 Drawing Sheets

NETWORK AND METHOD FOR THE CONFIGURATION THEREOF

CROSS-REFERENCE TO RELATED APPLICATIONS

This application claims priority under 35 U.S.C. §119 to European Patent Application No. 07115789.5 filed Sep. 6, 2007, the entire text of which is specifically incorporated by reference herein.

BACKGROUND OF THE INVENTION

The present invention relates to intra-server network environments for servicing a multitude of hardware controllers over a standard Ethernet LAN (Local Area Network).

A network of computers and Ethernet switches can be redundantly cabled up and configured in order to increase the level of fault-tolerance, for instance, in system control applications. An example of a system control network is described in F. Baitinger et al. "System control structure of the IBM eServer z900", IBM J. Res. & Dev., Vol. 46, No. 4/5, 2002, pp. 523-535. A similar service network and a solution in support of network configuration are also outlined in the U.S. Pat. No. 7,039,682. In both cases, the network-forming Ethernet switches are not cross-connected via Ethernet.

In this example setup, the redundancy in cabling and configuration is implemented in a way to reduce the number of different parts or configurations needed. Also, the setup must avoid manual configuration steps and intervention by a human being. A part in the setup can be exchanged at anytime without involving reconfiguration.

In one embodiment, the example setup features a physical network structure comprised of two Ethernet switches SWX-A and SWX-B. More generally, the example setup features two classes of computers:

Class (I) computers are called "controllers" herein. Class (I) computers have at least two network interfaces, eth0 and eth1 in terms of Ethernet. The maximum number of Class (I) computers is only limited by the physical connectivity of the Ethernet switches.

Class (II) computers are called "configuration servers" herein. Class (II) computers have only one network interface, eth0 in terms of Ethernet.

The controllers depend on configuration servers for their network configuration (e.g., assignment of Internet (IP) Protocol addresses). The configuration servers could also serve as boot source for the controllers. In this configuration the controllers contain only software with limited capabilities, which is only able to fetch the software code load (e.g. an operating system) from a configuration server.

Configuration servers depend on their location within the physical network infrastructure to discover their own identity, etc. For example, configuration servers can identify themselves as being cabled to switch SWX-A or switch SWX-B, respectively. Depending on its identity, a configuration server must configure its local network interfaces prior to servicing controllers. The configuration servers must be able to configure their network interfaces to be able to serve as a boot source for the controllers. The network configuration for each interface must be unique.

In order to be able to configure a unique IP address, a configuration server must be able to discover its own identity. The uniqueness of its identity serves as a basis for establishing a unique network configuration. If a network environment is redundantly configured, it appears as a perfectly symmetric structure. In order to extract locality information for the controllers, this symmetry needs to be broken.

In the prior art system control network example setup described above, this problem was not addressed. In this environment, the Ethernet switches are part of the computer server hardware itself. However, the problem becomes more severe when using Ethernet switches instead that are part of a normal network infrastructure so as to reduce the costs for the computer server hardware.

SUMMARY OF THE INVENTION

It is therefore an object of the present invention to provide a method for the configuration of a network that is improved over the prior art, a corresponding computer program and computer program product, a corresponding network, a corresponding network connection element, and a corresponding computer system.

This object is achieved by the present invention as defined in the independent claims. Further advantageous embodiments of the present invention are defined in the dependent claims.

The advantages of the present invention are achieved by a method for the configuration of a network, said network comprising two interconnected connection elements for interconnection among items in said network, said network further comprising a plurality of first type computers and a second type computer, said first type computers each having a first network interface and a second network interface, wherein said second type computer performs services requested and received by said first type computers via said network, and wherein data is exchanged in said network in the form of data packets, the method comprising the steps of:

each of said connection elements marking data packets that are sent to the other connection element via the interconnection between said connecting elements;

said first type computers sending service requests to said second type computer, wherein said service requests contain a unique identifier that identifies the sending first type computer and a network interface identifier, which determines whether the request is sent via the first network interface or via the second network interface of the sending first type computer;

said second type computer:

collecting data for a defined number of said service requests comprising the unique identifier and the network interface identifier of the sending first type computer and the information, if the data packet associated with the service request is marked;

determining from the collected data whether said second type computer is directly connected to said first connection element or to said second connection element; and configuring said network according to the result of the determination step.

The invention allows breaking symmetry by network measures, e.g., an Ethernet switch with predefined virtual LAN configurations (VLAN). Moreover, the invention allows non-intrusive marking of Ethernet frames while they are in transit. Futhermore, the invention enables automatic detection of Ethernet frames that cross Ethernet switches, which are interconnected by cross-over cables. Combined with specific protocol content, this information is used for determining to which switch a computer is connected. This information can be exploited for devising locality information, e.g., if the sender is connected to (located on) the same switch or on another one (the second one).

Another object of the invention is met by a network comprising two interconnected connection elements for the interconnection in the network, the network further comprising a plurality of first type computers and a second type computer, said first type computers each having a first network interface and a second network interface, wherein said second type computer performs services requested and received by said first type computers via said network, and wherein said network exchanges data in form of data packets, the network characterized by:

each of said connection elements marking data packets that are sent to the other connection element via the interconnection between said connection elements;

said first type computers sending service requests to said second type computer, wherein said service requests contain a unique identifier for the sending first type computer and a network interface identifier, which determines whether the request is sent via the first network interface or via the second network interface of the sending first type computer;

said second type computer:

collecting data for a defined number of said service requests comprising the unique identifier and the network interface identifier of the sending first type computer and the information, if the data packet associated with the service request is marked;

determining from the collected data whether said second type computer is directly connected to said first connection element or to said second connection element; and configuring said network according to the result of the determination step.

In an exemplary embodiment of the invention, a configuration server must come to a decision to determine its unique network-wide configuration to be able to serve controllers. This decision depends on the plug position of the configuration server under consideration and the assumption of plugging rules governing a "good" network infrastructure.

The dependent controllers periodically send network packets that will be marked if they traverse specific connection elements in the network. The origin and the path of such network packets can be determined.

The decision regarding the unique network-wide configuration of the configuration server is preferably based on a majority function based on the packets received by the configuration server. If the decision cannot be made, then errors in the cabled structure can be detected.

BRIEF DESCRIPTION OF THE DRAWINGS

Exemplary embodiments and their advantages are now described in conjunction with the accompanying drawings.

DETAILED DESCRIPTION

Network Configuration

Figure 1:
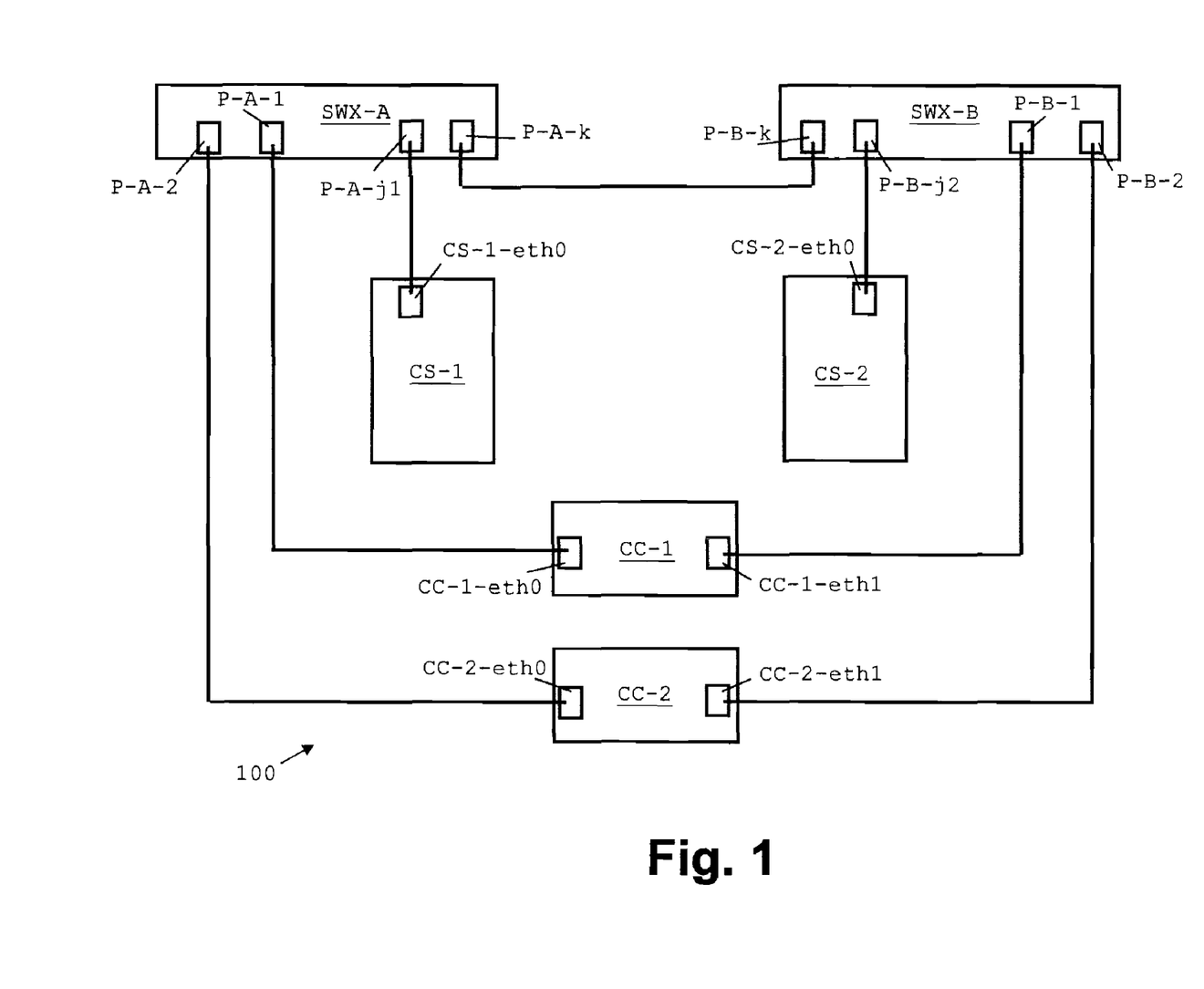
FIG. 1: Is a block diagram of a redundant network configuration.

FIG. 1 shows a redundant network 100 with two Ethernet switches SWX-A and SWX-B supporting the IEEE 802.1Q VLAN features. The network 100 further comprises two configuration servers CS-1 and CS-2 and two controllers CC-1 and CC-2. CC-1 and CC-2 are cabled up in the following way: Network interface CC-1-eth0 of controller CC-1 is cabled up to port P-A-1 at switch SWX-A. Network interface CC-1-eth1 of controller CC-1 is cabled up to port P-B-1 at switch SWX-B. Network interface CC-2-eth0 of controller CC-2 is cabled up to port P-A-2 at switch SWX-A. Network interface CC-2-eth1 of controller CC-2 is cabled up to port P-B-2 at switch SWX-B. Any useful scheme can be applied here, but a symmetric scheme is beneficial for practical reasons.

The configuration servers CS-1 and CS-2 are hooked up in the following way: Network interface CS-1-eth0 of client server CS-1 is hooked up to port P-A-j1 at switch SWX-A. Network interface CS-1-eth0 of client server CS-2 is hooked up to port P-B-j2 at switch SWX-B.

Switches SWX-A and SWX-B are cross-connected by one cross-over cable from port P-A-k at switch SWX-A to port P-B-k at switch SWX-B. Multiple cables between switches can only be used if the switches support "port trunking". Otherwise, a loop would be created. However, such multiple connections further enhance the redundancy in the network 100.

In such a fully redundant network setup, each controller and client server attached to one of the switches SWX-A or SWX-B can reach any other controller and configuration server. There is no way to determine which switch is SWX-A or SWX-B. The configuration servers CS-1 and CS-2 have no way to discover their identity in order to configure their network interface and to serve as a configuration and boot server for the controllers.

Only the controllers CC-1 and CC-2 are able to self-discover their identity. They always identify the same interface as Ethernet interface 0 (eth0) or as Ethernet interface 1 (eth1). As mentioned earlier, network interface CC-1-eth0 is hooked up to SWX-A, network interface CC-1-eth1 is hooked up to SWX-B, network interface CC-2-eth0 is hooked up to SWX-A, and network interface CC-2-eth1 is hooked up to switch SWX-B.

The controllers CC-1 and CC-2 can discover their identity in the network 100 by other means also. For example, they can discover their relative placement in the network infrastructure (i.e., they can determine their relative positions among controllers 0 to n). This is an extension which may be used but is not required by the present invention.

Besides the switches SWX-A and SWX-B, the configuration servers CS-1 and CS-2 also must support tagged VLAN according to the IEEE 802.1Q standard. The controllers CC-1 and CC-2 may also support tagged VLAN according to the IEEE 802.1Q standard. The maximum number of configuration servers in a network configuration is limited by the size of the priority bit field (three bits) in the IEEE 802.1Q VLAN frame standard.

The operating systems of the configuration servers CS-1 and CS-2 must enable "VLAN awareness" by sending and receiving VLAN tagged frames. These operating systems must also enable filtering of tagged frames on the link layer prior to delivering the frames to upper level TCP/IP protocols (TCP is an abbreviation for Transmission Control Protocol).

The controllers CC-1 and CC-2 may enable VLAN-awareness or may refrain from doing so. In the latter case, the controllers CC-1 and CC-2 send untagged Ethernet frames, and the connected switch (SWX-A or SWX-B) must insert a default tag on ingress (when the frame enters the switch).

The switches SWX-A and SWX-B, the configuration servers CS-1 and CS-2, and the controllers CC-1 and CC-2 must be configured to a "configuration VLAN" with VLAN tag="V-1". For simplicity reasons, "V-1" is the VLAN tag attached to Ethernet frames and switch ports according to the IEEE 802.1Q VLAN standard operation.

The switch ports P-A-k, P-A-j1, P-B-k, P-B-j2 must accept and forward V-1 tagged frames. The switch ports P-A-1, P-A-2, P-B-1, P-B-2 must accept untagged frames, attach the default tag V-1, and untag (i.e., remove the tag from) V-1 tagged frames on egress. The VLAN unawareness of the ports lowers the requirements on early boot codes running on the controllers CC-1 and CC-2. The switch ports P-A-j1 and P-B-j2 must not untag V-1 frames on egress. The switch ports P-A-k and P-B-k must untag V-1 frames on egress. The switch ports P-A-k and P-B-k must assign the default tag [V-1, PRIO=1] on ingress (see IEEE 802.1Q standard for explanation of priority fields). All other VLAN tag bytes contain PRIO=0 (default). The tag priorities must not be used for any other purpose.

The IP address assignment rules used by the configuration servers CS-1 and CS-2 define that:
  Every network interface that is connected to SWX-A has an IP address belonging to a predefined subnet IP-A.
  Every network interface that is connected to SWX-B has an IP address belonging to a predefined subnet IP-B.
  The subnets IP-A and IP-B must be different.
  The subnets IP-A and IP-B are known to the configuration servers CS-1 and CS-2 and the controllers CC-1 and CC-2.

The following VLAN configuration example is presented in a symbolic language in order to abstract from product-specific notations. It can be processed by a translator tool to yield the register-level commands for a programmable Ethernet switch, which can be used to implement the switches SWX-A and SWX-B. The switch has twenty four (24) switch ports numbered from 0 to 23.

The VLAN tag is 10 for the configuration VLAN. Ports 0 and 1 are reserved. The cross-switch ports are 2 and 3. Only one of them can be used if the switch device does not support port aggregation (port trunking). Ports for connecting to the configuration servers CS-1 and CS-2 are 4 and 5. Ports for connecting to the controllers CC-1 and CC-2 are 6 up to 23.

The VLAN configuration file example contains the following lines:

```
VLAN CREATE 10
SET PORT 2 PRIO 1
SET PORT 3 PRIO 1
SET PORT 2 TO 23 PVID 10
ADD PORT 2 TO 23 TO VLAN 10
UNTAG PORT 2 IN VLAN 10
UNTAG PORT 3 IN VLAN 10
UNTAG PORT 6 TO 23 IN VLAN 10
```

The format and processing of the example configuration file is further explained in IPCOM000156036D in connection with a specific implementation of the switches SWX-A and SWX-B.

Automatic Detection of Frame Traversal Across Ethernet Switches

The invention facilitates discovering the identity of configuration servers by determining whether they are hooked up to either SWX-A or SWX-B, with the help of:
  the above configuration for VLAN 10 for the network 100 that enables the detection of frames that have crossed the interconnect cable between switches; and
  transport information contained in Ethernet frames being sent by the controllers CC-1 and CC-2, such as the outgoing network interface (e.g., CC-1-eth0 or CC-1-eth1) and the controller identity.

Since the configuration servers CS-1 and CS-2 may reboot at any time (and lose their state), they must be able to "discover" the state of the infrastructure of the network 100 again. The configuration servers CS-1 and CS-2 can only receive frames sent voluntarily by CC-1 and CC-2 or trigger the sending of frames by CC-1 and CC-2 on request. DHCP (Dynamic Host Configuration Protocol) messages support the former case, whereas ARP (Address Resolution Protocol) and ICMP (Internet Message Protocol) ECHO responses support the latter case.

The configuration servers CS-1 and CS-2 need a way to alternate between passive receiving of messages (i.e., listening) and active triggering of messages. Therefore, the configuration servers CS-1 and CS-2 each maintain a "connectivity table." After receiving a frame from one of the controllers, a connectivity table comprises the following information:
  A controller identity (name, number) of the sending controller: The simplest controller identity which can be used is one of the MAC (Media Access Control) addresses of the Ethernet interfaces 0 and 1 (e.g., the MAC address of CC-1-eth0 or CC-1-eth1 in the event the frame was sent by CC-1).
  The outgoing network interface used by the controller to send the frame (e.g., CC-1-eth0 or CC-1-eth1).
  The frame priority: The cross-switch origin marker of the frame. According to the IEEE 802.1Q standard, the frame priority field PRIO=0 is the local switch, and the frame priority field PRIO=1 is the remote switch.
  The switch: Combines the frame priority with the outgoing network interface to indicate the source switch for the controller identity.

For the connectivity table, a "counting method" is defined as an operation that calculates the number of table rows with matching outgoing network interface and priority.

Figure 2:
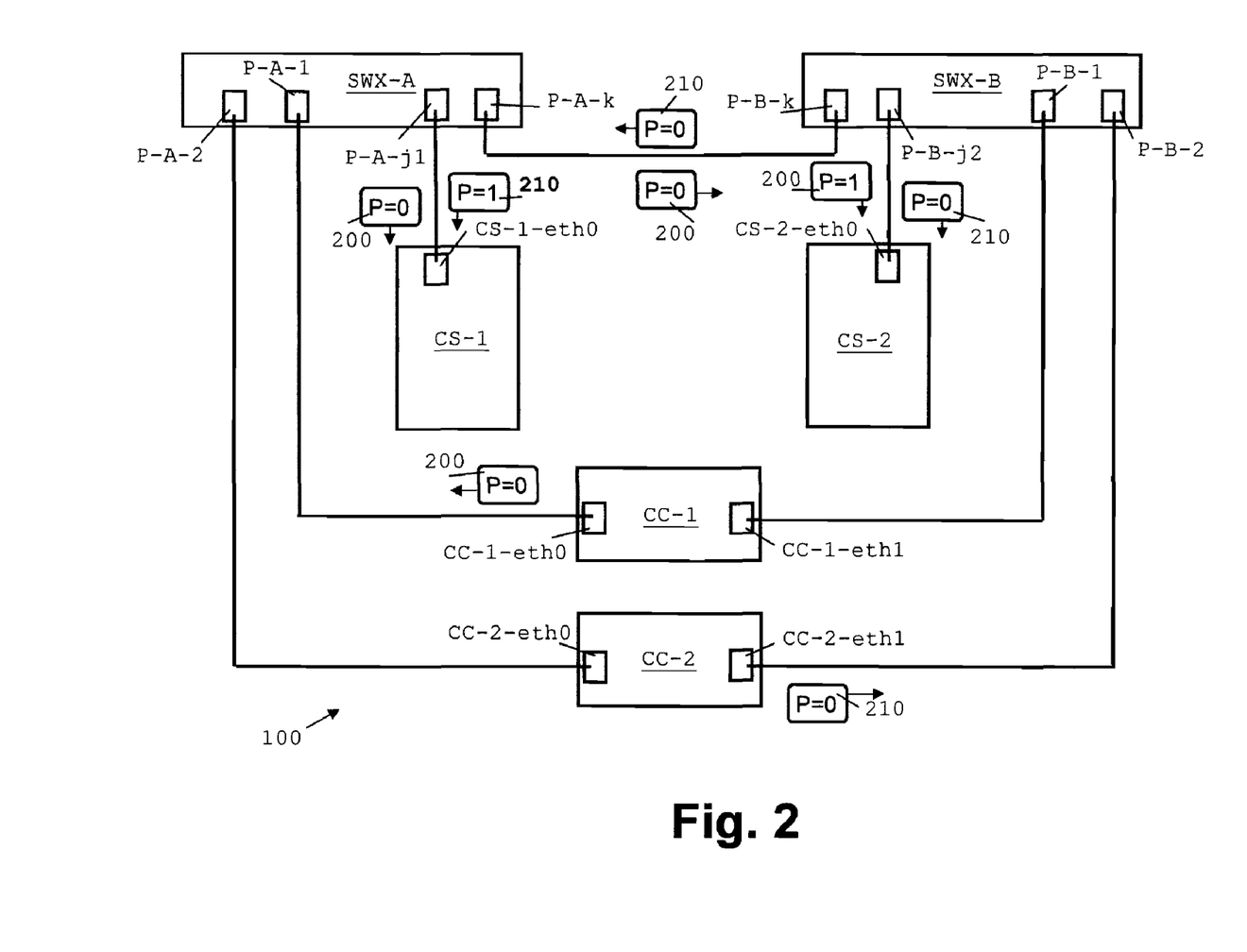
FIG. 2: Shows a traversal of Ethernet frames in the network of FIG. 1 in accordance with an exemplary embodiment of the invention.

FIG. 2 shows the traversal of priority-tagged frames originating from the different source computers through the switches SWX-A and SWX-B.

A frame 200 is sent with priority 0 (P=0) by the controller CC-1 via its network interface CC-1-eth0 to the switch port P-A-1 of switch SWX-A. Then, switch SWX-A forwards the frame 200 to the configuration server CS-1 via the switch port P-A-j1. Configuration server CS-1 receives frame 200 via its network interface CS-1-eth0. Further, switch SWX-A forwards frame 200 via network port P-A-k to switch SWX-B. Switch SWX-B receives frame 200 via its network port P-B-k and forwards the frame 200 to configuration server CS-2 via network port P-B-j2. During this forwarding, switch SWX-B changes the priority of frame 200 to 1 (P=1) to indicate that the frame 200 was received from the remote switch SWX-A. Configuration server CS-2 receives the frame 200 via its network interface CS-2-eth0.

A frame 210 is sent with priority 0 (P=0) by the controller CC-2 via its network interface CC-2-eth0 to the switch port P-B-1 of switch SWX-B. Then, switch SWX-B forwards the frame 210 to the configuration server CS-2 via the switch port P-B-j2. Configuration server CS-2 receives frame 210 via its network interface CS-2-eth0. Further, switch SWX-B forwards frame 210 via network port P-B-k to switch SWX-A. Switch SWX-A receives frame 210 via its network port P-A-k and forwards the frame 210 to configuration server CS-1 via network port P-A-j1. During this forwarding, switch SWX-A changes the priority of frame 210 to 1 (P=1) to indicate that the frame 210 was received from the remote switch SWX-B. Configuration server CS-1 receives the frame 210 via its network interface CS-1-eth0.

Figure 3:
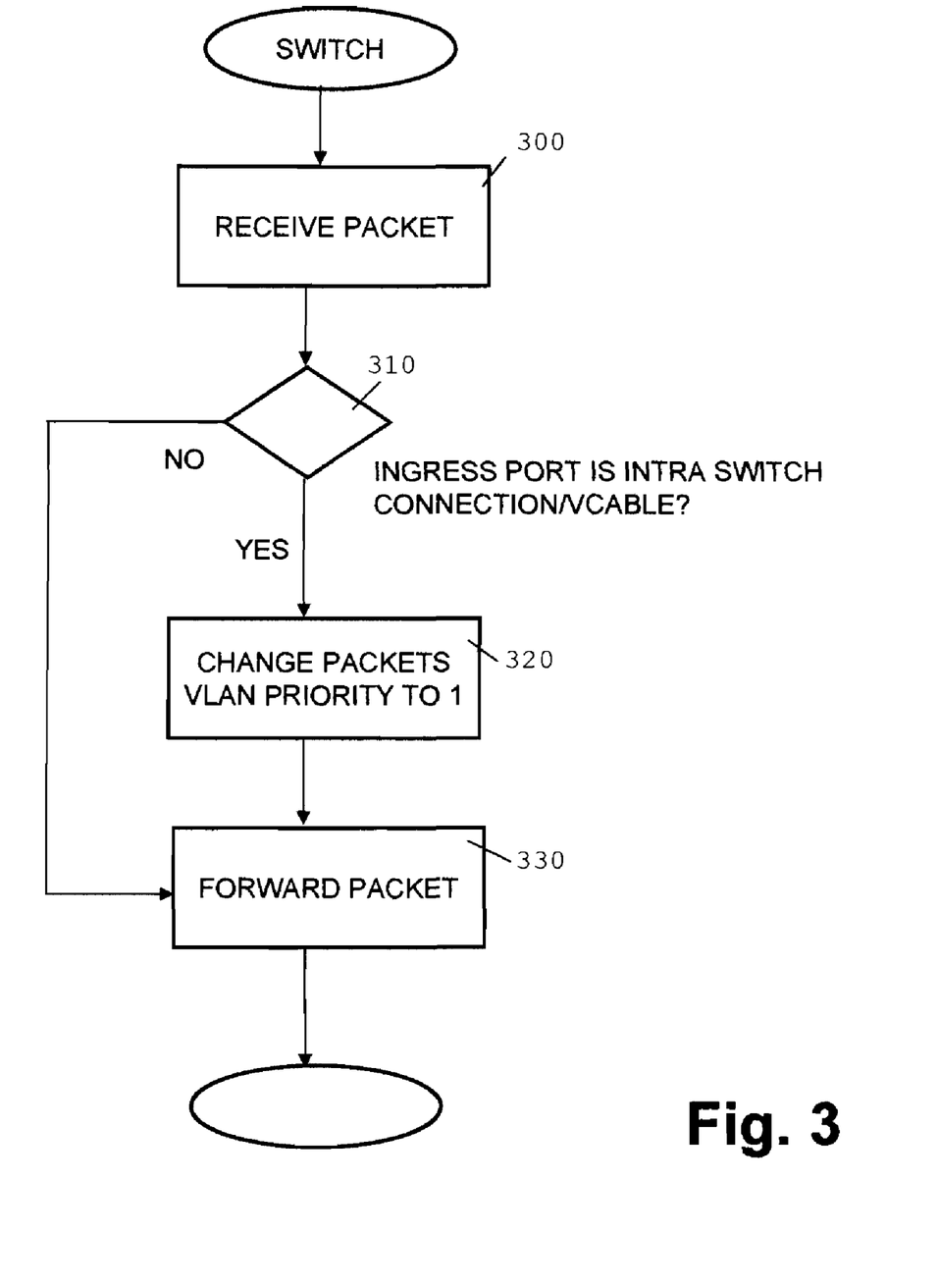
FIG. 3: Is a flow diagram illustrating a method in accordance with an exemplary embodiment of the invention performed by a network switch.

FIG. 3 illustrates the packet forwarding performed by the switches SWX-A and SWX-B. In step 300, the switch receives a packet with the VLAN tag V-1 (see tag 10 in the example switch configuration above). Then, in step 310 the switch determines if the ingress port is associated with the intra-switch connection/cable; for the switch SWX-A this would be port P-A-k, and for switch SWX-B this would be port P-B-k. If the ingress port is associated with the intra-switch connection/cable, then in step 320 the switch changes the VLAN priority of the packet to 1 and forwards the packet to the ports associated with the VLAN V-1 (tag 10 in the example above) in step 330. Otherwise, the packet is directly forwarded in step 330.

Figure 4:
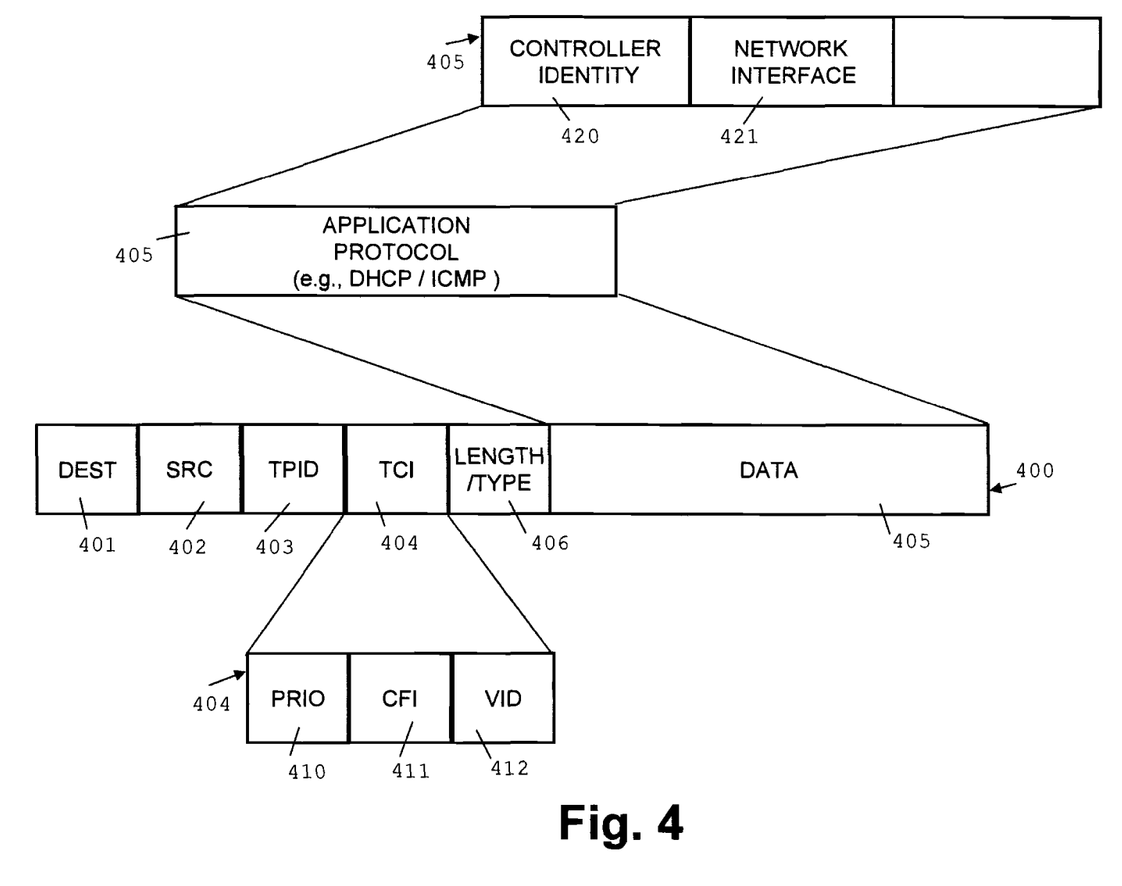
FIG. 4: Is a block diagram illustrating an Ethernet frame.

FIG. 4 illustrates an Ethernet frame 400, which is used in the VLAN V-1 (tag 10 in the example above) according to the IEEE 802.1Q standard. The Ethernet frame 400 contains:
  a destination (DEST) field 401, which stores the MAC address of the destination Ethernet port to which the Ethernet frame 400 is addressed;
  a source (SRC) field 402, which stores the MAC address of the Ethernet port from which the Ethernet frame 400 was sent;
  a Tag Protocol ID (TPID) field 403, which identifies the Ethernet frame 400 as an IEEE 802.1Q frame;
  a Tag Control Information (TCI) field 404;
  a data field 405, which comprises the actual payload of the Ethernet frame 400; and
  a length/type field 406, which encodes the length and type of payload stored in the data field 405.

It should be noted that the TPID field 403 and the TCI field 404 can be referred to collectively as a virtual local area network tag.

The TCI field 404 contains:
  a priority (PRIO) field 410, which stores the priority level associated to the Ethernet frame 400;
  a Canonical Format Identifier (CFI) field 411, in which a 1 is always stored, as the VLAN V-1 (tag 10 in the example above) is using Ethernet switches; and
  a VLAN ID (VID) field 412, which stores V-1 (tag 10 in the example above) as the VLAN ID for VLAN V-1.

The data field 405 can comprise any higher level protocol data as payload of the Ethernet frame 400, e.g. DHCP-related or ICMP-related data. If the protocol does not contain field 402, it must allow the payload to contain a controller identity field 420 that can store the controller identity. Moreover, if the protocol does not contain IP address information (e.g., a source and a destination address), it must allow the payload to contain a network interface field 421 that can store a network interface identifier. The controller identifier fields 420 and 402 and cabling information provided by the protocol (see the example for the ARP protocol described hereafter) or the network interface identifier field 421 will be used by a controller to store its controller identity and its network interface identifier, which is associated with the Ethernet port from which the Ethernet frame 400 is sent by the controller. In step 320, the switch changes the priority field 410 to 1.

The following table is an example for the connectivity tables constructed by the configuration servers CS-1 and CS-2:

| Controller Identity | Source Network Interface | Path/VLAN Priority |
|---|---|---|
| YH13231221 | eth0 | 0 |
| YH13231221 | eth0 | 0 |
| YH13231221 | eth1 | 1 |
| YH132312212 | eth1 | 1 |
| ... | ... | ... |
| YH132312217 | eth0 | 0 |

After receiving the frames 200 and 210, the configuration servers CS-1 and CS-2 decide whether to stay in listening mode or to change to triggering mode in order to solicit frames from controllers. When the connectivity table has reached certain completeness or when a minimum time is reached (in order to ensure that cabling errors are really recognized), then the counting method is applied for outgoing network interface eth0 and priority 0 is performed in the connectivity table. If, depending on the physical network configuration, a sufficiently large number is obtained as a result, then the configuration server is connected to switch SWX-A. The counting method applied for outgoing network interface eth1 and priority 1 should yield a similar result.

Cases with conflicting updates indicate configuration errors. An example is the case where a configuration server receives several messages from controllers, which indicate that the outgoing network interface is eth0 and that the priority is 0, and also receives a smaller amount of messages from other controllers, which indicate that the outgoing network interface is eth1 and that the priority is 0. The identifier of the smaller set of controllers is then excluded from a subsequent calculation by applying the counting method. Cases with outgoing network interface eth0 and priority 1 indicate cabling errors. Moreover, cases with outgoing network interface eth1 and priority 0 indicate cabling errors.

The same counting method with data field eth1 for the outgoing network interface and 0 for the priority is performed in the connectivity table by the configuration servers CS-1 and CS-2. If, depending on the physical configuration, a sufficiently large number is obtained as a result, then the configuration server is connected to switch SWX-B. The inverted projection with outgoing network interface eth0 and priority 1 should yield a similar result. Cases with outgoing network interface eth0 and priority 0 indicate cabling errors. Moreover, cases with outgoing network interface eth1 and priority 1 indicate cabling errors.

ETH-i Group Membership

A service network with two cross-connected Ethernet switches exhibits an ETH0 group and an ETH1 group of connected computers with respect to a well-defined "consistency" requirement (e.g., all eth0 or eth1 interfaces of controllers hooked up to the same switch, respectively).

For an exemplary embodiment of the invention, it is assumed that the number of controllers in the ETH0 group is equal to the number of controllers in the ETH1 group. A configuration server belongs to an ETH-i group if it fulfils the consistency requirement.

For the example network 100, the consistency requirement is that the Ethernet interfaces in the ETH0 group are all directly hooked up to the switch SWX-A and that the Ethernet interfaces in the ETH-1 group are all directly hooked up to switch SWX-B. The eth0 interfaces of the controllers CC-1 and CC-2 are connected to switch SWX-A, and the eth1 interfaces of the controllers CC-1 and CC-2 are connected to switch SWX-B. Configuration server CS-1 belongs to group ETH0 since its Ethernet interface CS-1-eth0 is hooked up to switch SWX-A, and configuration server CS-2 belongs to group ETH1 since its Ethernet interface CS-2-eth0 is hooked up to switch SWX-B.

Each configuration server must individually determine its membership in either the ETH0 or ETH1 group during its initial setup phase in order to be able to serve as a configuration server for the respective group. However, the controllers can determine the source interface when sending a packet by low level device driver means. Thus, controllers can determine their group membership directly.

The method according to the invention combines the collection and calculation of network packets received from ETH0 and ETH1 group members. A configuration server belongs to the ETH0 group if and only if the number of packets received from ETH0 group members with priority 0 exceeds the number of other packets. The same statement applies for the ETH1 group membership of a configuration server. The method may leave a configuration server in an undecided state if a majority of the number of expected network packets cannot be found.

More abstractly, the ETH-i group can be defined as the set of all computing elements that satisfy the following consistency rule (ETH-i Consistent Cabling Rule): A collection of wirings (cables) from a set of controllers in the ETH-i group is called "consistent" if and only if these cables are connected to the same Ethernet switch (interchangeable plug positions at the same switch are ignored and are not relevant for the invention).

Determination of ETH-i Group Membership

A configuration server can determine its group membership only by receiving network packets from a controller. The principal flow employs an Ethernet protocol P-X that satisfies the following requirements:

Controllers can use P-X during initial boot or at a later time when their operating system is active.

Controllers can supply the required information by sending a P-X packet with the following elements: Name of sourcing network interface (eth0 or eth1), identity of the sending controller. Any protocol that permits extraction of this data can be used for the subsequent step.

Configuration servers can receive P-X packets and evaluate the VLAN information in the Ethernet packet. Based on these packets, a "connectivity table" can be constructed with the following columns (new rows are created only if the unique element "Controller identity" is not yet contained):
Controller identity
Controller source interface
Priority field from VLAN tag An example for the protocol P-X is the BOOTP protocol, provided that it is supported by early boot code in the controller (see U.S. Pat. No. 7,039,682). Alternately, a combination of other open network protocols with appropriate trigger points for sending and receiving packets can be used. For example, a combination of DHCP and ICMP can be used if the early boot requirement is at least met for DHCP.

A practical implementation can freely choose a suitable method for creating the controller identity. Examples include using the MAC address of the sending network interface, using the combination of all MAC addresses of all network interfaces, or fetching a unique serial number from an EEPROM (Electrically Erasable Programmable Read-Only Memory) device.

Based on the connectivity table, a configuration server calculates the following matrix entries (the number of received packets from each controller in the network is not determined, but rather the calculation is based upon the number of controller instances being visible at the configuration server):

Decision matrix E[,] is defined as:
E[i,j]=number of entries with "controller source interface"=eth-i and "priority field"=j for i=0,1.
Decision criteria are defined in the following way:
A controller belongs to the ETH-0 group if and only if
E[0,0]>max{E[1,0], E[0,1]}
and
E[1,1]>max{E[1,0], E[0,1]}.
Conversely, a configuration server belongs to the ETH-1 group if and only if
E[0,1]>max{E[0,0], E[1,1]}
and
E[1,0]>max{E[0,0], E[1,1]}.

Some examples are shown in order to exemplify "normal" and "pathological" cases. Normal or "ideal" cases according to the consistency rule exhibit E[0,0]=n and E[1,1]=n for the ETH-0 group determination, and E[0,1]=n and E[1,0]=n for the ETH-1 determination:

For ETH-0 membership:

$$E = \begin{pmatrix} n & 0 \\ 0 & n \end{pmatrix}$$

For ETH-1 membership:

$$E = \begin{pmatrix} 0 & n \\ n & 0 \end{pmatrix}$$

The smallest pathological case exhibits E[i,j]=1 for all i=0,1. This case suggests one mis-cabled controller (e.g., for network 100, eth0 hooked up to SWX-B, and eth1 hooked up to SWX-A). In this case, group membership cannot be decided:

$$E = \begin{pmatrix} 1 & 1 \\ 1 & 1 \end{pmatrix}$$

The counting method has been reduced to calculating matching rows in the connectivity table, which can be easily implemented.

Cases which deviate from the "ideal" case with non-zero values in the counter diagonal for the ETH-0 or ETH-1 matrix, respectively, indicate cabling errors violating the consistency rule.

Practical Implementation Considerations with Open Network Protocols

The invention covers the network auto-configuration of the entire network 100, which includes the network configuration of the controllers CC-1 and CC-2, the configuration servers CS-1 and CS-2, and the switches SWX-A and SWX-B.

Example protocols that can be used for the network configuration are:

The extension of the BOOTP protocol described in U.S. Pat. No. 7,039,682.

DHCP by adding vendor encapsulated options for having them contain the sending interface. Modern DHCP client programs allow the exploitation of this by allowing setting options based on the interface over which a DHCP request is sent. The source MAC address is part of the default options of the DHCP protocol.

ARP requests.

ICMP packets.

In the case of ARP requests, the source IP address indicates the sending interface based on the cabling rules defined for that network. Let IP-A specify that the ARP request was sent over the eth0 network interface of the sending controller, and let IP-B specify that the ARP request was sent over the eth1 network interface of the sending controller. The MAC address is part of the MAC header of that packet. IP-A and IP-B have been supplied by the configuration server based on a function f((P-SRC, P-PTH))=IP-X, which means that for a packet source P-SRC and packet path P-PTH a unique IP address IP-X is provided dependant on this information. This function is invertible (i.e., f'(IP-X)=(P-SRC, P-PTH)), which means that there is a way to calculate the packet source and packet path from a unique IP address. Because of this, IP-X and (P-SRC, P-PTH) provide the same information. An implementation for the determination of P-PTH is the VLAN priority of the received packet according to an exemplary embodiment of the invention.

For ICMP packets, the source IP address indicates the sending interface based on the cabling rules defined for that network. IP-A specifies that the ARP request was sent over eth0, and IP-B specifies that the ARP request was sent over eth1. The MAC address is part of the MAC header of that packet.

For the entire aforementioned example protocols, the VLAN priority is part of the VLAN header at ISO/OSI layer 2 (ISO: International Organization for Standardization; OSI: Open Systems Interconnection).

In the power-on phase, the switches SWX-A and SWX-B get power and load their configuration and VLAN configuration from stable local storage such as an EEPROM (Electrically Erasable Programmable Read-Only Memory). Further, the controllers CC-1 and CC-2 get power and start a boot code from their local storage. This includes code for configuring the network interfaces CC-1-eth0, CC-1-eth1, CC-2-eth0, and CC-2-eth1. More specifically, the controllers CC-1 and CC-2 send out boot requests and/or network configuration DHCP requests, which must be served by any one of the configuration servers CS-1 and CS-2.

These requests contain some configuration data. The DHCP vendor fields include a field for:

The Ethernet interface (eth0 or eth1) from which the request is sent out.

The controller identifier (if the controller has no other hardware means to determine its identifier, this identifier is the MAC address of the sending Ethernet interface).

Optionally, the controller type (for supporting different controller types).

For IP networks, DHCP and TFTP (Trivial File Transfer Protocol) are used as network configuration and boot protocols. The fields mentioned above are sent as part of the vendor extension of the DHCP protocol.

The configuration servers CS-1 and CS-2 start from stable storage (e.g., EEPROM or hard disk). They must configure their network interfaces CS-1-eth0 and CS-1-eth0 in order to serve as boot and/or configuration servers.

After the power-on phase, the configuration servers CS-1 and CS-2 execute the configuration phase. During this phase, they send out network packets which cause the controllers CC-1 and CC-2 to send out response packets. For an IP network protocol, the ICMP PING method is used. For other OSI layer 3 protocols, similar means can be used.

The configuration servers CS-1 and CS-2 receive all Ethernet frames which are addressed to themselves or are broadcast packets by looking at the VLAN priority field in the Ethernet frame and the boot packets (DHCP REQUEST) containing the network interface identifier and the controller identifier, or by looking at the ICMP response packet containing a MAC and IP address (since the IP address was provided by a configuration server before and can be converted into the network interface identifier based on cabling and configuration rules defined for network 100 (e.g., a specific IP address is assigned to an eth0 interface), it contains the same information).

Based on their connectivity table, the configuration servers CS-1 and CS-2 are able to determine the switch (either switch SWX-A or SWX-B) to which they are hooked up and are able to configure their network interfaces CS-1-eth0 and CS-2-eth0. Once these network interfaces are configured, the configuration servers CS-1 and CS-2 start all protocols (DHCP, TFTP) in order to serve as boot and/or configuration servers.

Figure 5:
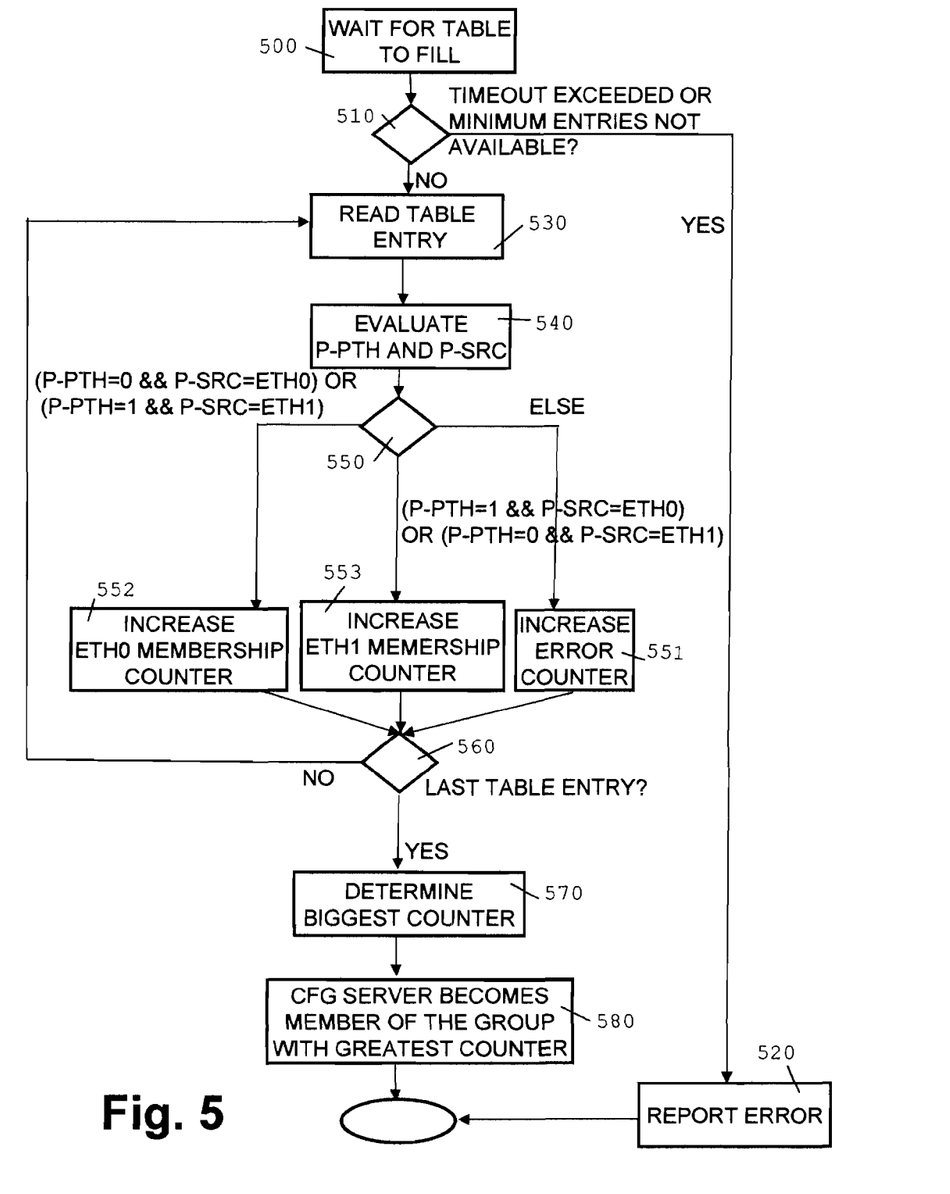
FIG. 5: Is a flow diagram illustrating a method in accordance with an exemplary embodiment of the invention.

FIG. 5 illustrates the method performed by each of the configuration servers CS-1 and CS-2 to determine its group membership. The method increases an error counter, which starts at 0, an ETH0 membership counter, which starts at 0, and an ETH1 membership counter, which starts at 0. In step 500, the configuration server waits until the connectivity table is filled with entries. In step 510, the configuration server determines whether a timeout value for the connectivity table to be filled up with values is already exceeded, or if not exceeded whether the minimum number of entries in the connectivity table is not available. If either the timeout value is exceeded or the minimum number of entries is not available, then an error is reported by the configuration server in step 520. Otherwise, a table entry is read from the connectivity table in step 530.

In step 540, the packet path P-PTH and the packet source P-SRC of the packet associated with the read table entry are evaluated. Subsequently, in step 550 two conditions C1 and C2 are tested:

(*P-PTH*=0 AND *P-SRC*=*ETH*0) OR (*P-PTH*=1 AND *P-SRC*=*ETH*1);  Condition C1:

(*P-PTH*=1 AND *P-SRC*=*ETH*0) OR (*P-PTH*=0 && *P-SRC*=*ETH*1).  Condition C2:

Therefore, only one of the conditions C1 and C2 can be fulfilled at the same time. If both conditions C1 and C2 are not fulfilled, then an error counter will be increased in step 551. Subsequently, in step 560 it will be determined if the table entry was the last table entry. If condition C1 is fulfilled, then in step 552 the ETH0 membership counter will be increased. If condition C2 is fulfilled, then in step 553 the ETH1 membership counter will be increased. After step 551, step 552, or step 553, step 560 will be performed by the configuration server.

If the configuration server determines in step 560 that the table entry is not the last table entry, then the next table entry will be read by the configuration server in step 530. Otherwise, the configuration server determines in step 570 which counter is the greatest. If the error counter is greater than the other two counters, or if the ETH0 membership counter is equal to the ETH1 membership counter, the configuration server assumes that an error exists in the configuration of the network. If the ETH0 membership counter is greater than the ETH1 membership counter, then in step 580 the configuration server becomes a member of the ETH0 group. If the ETH1 membership counter is greater than the ETH0 membership counter, then in step 580 the configuration server becomes a member of the ETH1 group.

Single CS Setup

In the power-on phase, the switches SWX-A and SWX-B get power and are loading their configuration and VLAN configuration from stable local storage like an EEPROM. Further, the controllers CC-1 and CC-2 get power and start a boot code from their local storage. This includes code for configuring the network interfaces CC-1-eth0, CC-1-eth1, CC-2-eth0, CC-2-eth1. More specifically, the controllers CC-1 and CC-2 send out boot requests and/or network configuration DHCP requests, which must be served by one of the configuration servers CS-1 and CS-2. This configuration server is plugged to either SWX-A or SWX-B.

Let this configuration server be CS-1. Configuration server CS-1 starts from stable storage (e.g., EEPROM or hard disk) and must configure its network interface CS-eth0 in order to serve as boot and/or configuration server.

Figure 6:
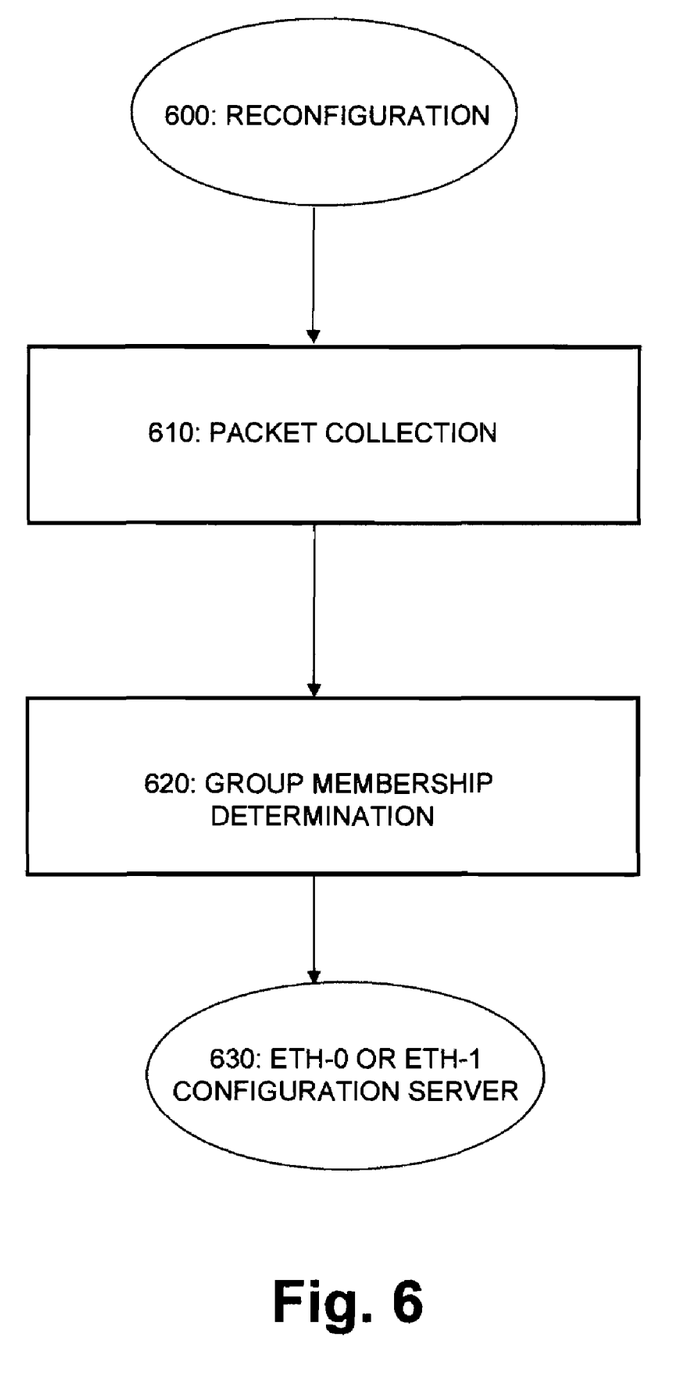
FIG. 6: Is a flow diagram illustrating a method in accordance with an exemplary embodiment of the invention.

After the power-on phase, the configuration server CS-1 executes the configuration phase. During this phase, it sends out network packets which cause the controllers CC-1 and CC-2 to send out response packets. For an IP network protocol, the ICMP PING method is used. For other OSI layer 3 protocols, similar means can be used. FIG. 6 illustrates the configuration phase as the configuration step 600.

In the packet collection step 610, the configuration server CS-1 receives all Ethernet frames which are addressed to it or are broadcast packets by looking at the VLAN priority field in the Ethernet frame and the boot packets (DHCP REQUEST) containing the network interface identifier and the controller identifier, or by looking at the ICMP response packet containing a MAC and IP address (since the IP address was provided by a configuration server before and can be converted into the network interface identifier based on cabling and configuration rules defined for this network (e.g., this IP address has been assigned to an eth0 interface), it contains the same information).

Based on its connectivity table, the configuration server CS-1 is able to determine the switch (either switch SWX-A or SWX-B) to which it is hooked up and is able to configure its network interface CS-1-eth0. This is done in step 620, in which the configuration server determines its group membership. Subsequently, in step 630 the configuration server CS-1 will configure its network setup depending on whether it belongs to the ETH0 group or the ETH1 group. Once the network interface CS-1-eth0 is configured appropriately, the configuration server CS-1 starts all protocols (DHCP, TFTP) in order to serve as a boot and/or configuration server.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disc-read only memory (CD-ROM), compact disc-read/write (CD-R/W) and DVD.

The terms "certain embodiments", "an embodiment", "embodiment", "embodiments", "the embodiment", "the embodiments", "an exemplary embodiment", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary, a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
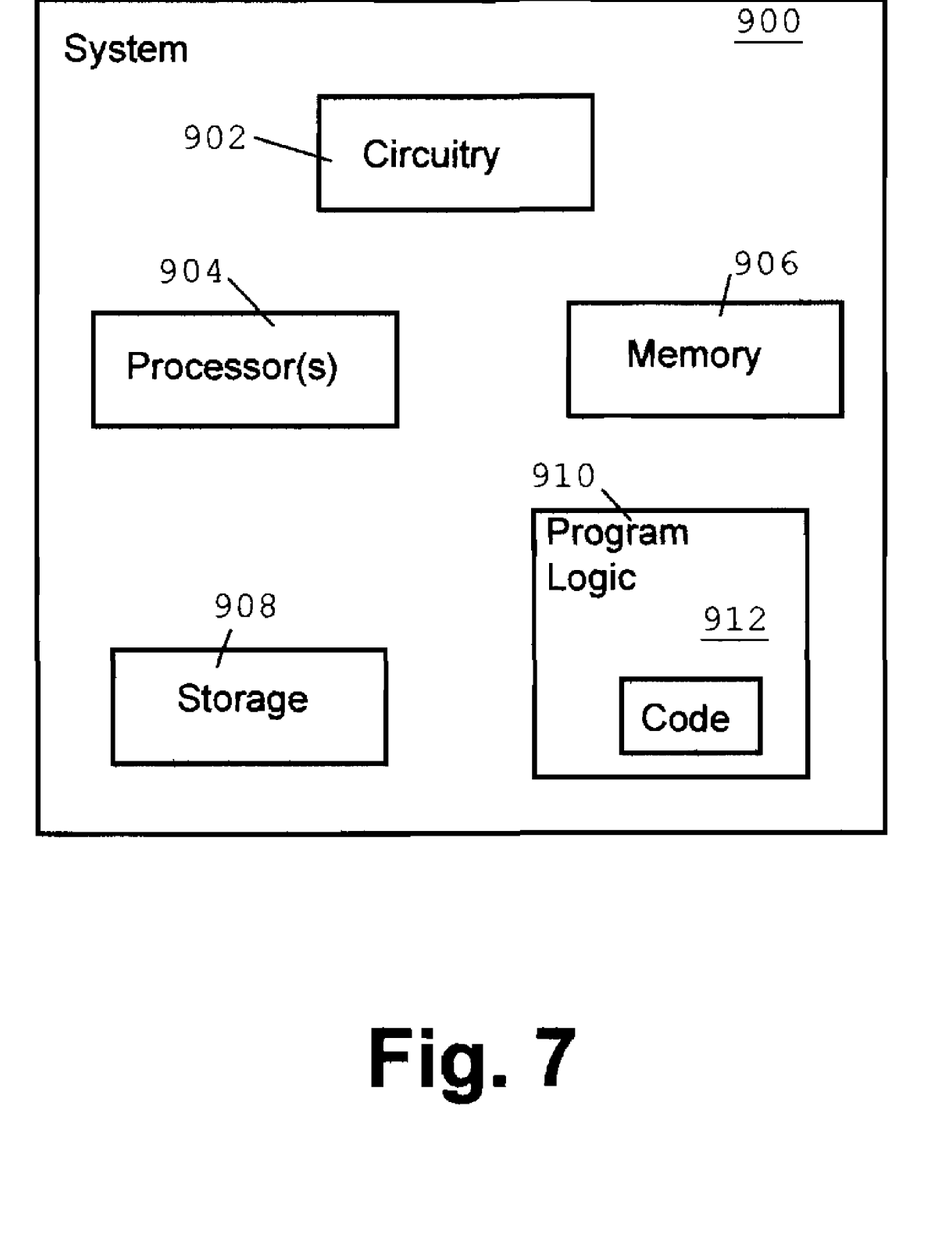
FIG. 7: Is a block diagram of a system in which certain exemplary embodiments may be implemented.

FIG. 7 illustrates a block diagram of a computer system 900 in which certain embodiments may be implemented. The system 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910, including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 7 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least some of the operations illustrated in the figures may be performed in parallel as well as sequentially. In alternative embodiments, some of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more, or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for the configuration of a symmetric network, said symmetric network comprising two interconnected connection elements for interconnecting said symmetric network, said network further comprising a plurality of first type computers and a second type computer, said first type computers each having a first network interface and a second network interface, wherein said second type computer performs services requested and received by said first type computers via said symmetric network, and wherein data is exchanged in said symmetric network in the form of data packets, the method comprising:

marking data packets, using at least one of said connection elements, that are sent to the other connection element via the interconnection between said connection elements;

sending service requests, using said first type computers, to said second type computer, wherein said service requests contain a unique identifier identifying the sending first type computer and a network interface identifier, which determines whether the request is sent via the first network interface or via the second network interface of the sending first type computer;

collecting data, using said second type computer, for a defined number of said service requests comprising the unique identifier and the network interface identifier of the sending first type computer and the information, if the data packet associated with the service request is marked;

determining from the collected data, using said second type computer, whether said second type computer is directly connected to said first connection element or to said second connection element; and configuring said symmetric network, using said second type computer, using the result of said determining step.

2. The method according to claim 1, wherein the data packets comprise a virtual local area network tag, and wherein a priority field of said virtual local area network tag is used to mark a data packet in said marking step.

3. The method according to claim 1, wherein said second type computer is a configuration server that performs configuration services for said first type computers.

4. The method according to claim 3, wherein said configuration server assigns network addresses to the first network interface and/or the second network interface of said first type computers as part of said configuration services.

5. The method according to claim 1, wherein said connection elements are cross-connected Ethernet switches and said data packets are Ethernet frames.

6. The method according to claim 5, wherein in said determining step, said second type computer further determines whether said second type computer is directly operably engaged with either the first Ethernet switch or the second Ethernet switch.

7. A computer program loaded into the internal memory of a digital computer system comprising software code portions for performing a method according to claim 1 when said computer program is run on said computer system.

8. A computer program product comprising a non-transitory computer usable medium storing program instructions executable by a computer, the stored program instructions comprising a computer program according to claim 7.

9. A symmetric network comprising:
- at least two interconnected connection elements for the interconnection in the symmetric network;
- a plurality of first type computers, said first type computers having a first network interface and a second network interface each;
- a second type computer, wherein said second type computer is configured for performing services requested and received by said first type computers via said symmetric network, and wherein said symmetric network exchanges data in form of data packets;
- wherein each of said connection elements are configured for marking data packets that are sent to the other connection element via the interconnection between said connection elements;
- wherein said first type computers are configured for sending service requests to said second type computer, wherein said service requests contain a unique identifier for the sending first type computer and a network interface identifier, which determines whether the request is sent via the first network interface or via the second network interface of the sending first type computer;
- wherein said second type computer is configured for collecting data for a defined number of said service requests comprising the identifier and the network interface identifier of the sending first type computer and the information, if the data packet associated to the service request is marked;
- wherein said second type computer is further configured for determining from the collected data whether said second type computer is directly connected to said first connection element or to said second connection element; and
- wherein said second type computer is further configured for configuring said symmetric network according to the result of the determination step.

10. A network connection element serving as a connection element according to claim 9.

11. A computer system serving as a first type computer and/or a second type computer according to claim 9.

* * * * *